(12) United States Patent
Okubo

(10) Patent No.: US 8,376,517 B2
(45) Date of Patent: *Feb. 19, 2013

(54) METHOD FOR MANUFACTURING LIQUID FLOW PASSAGE UNIT, LIQUID FLOW PASSAGE UNIT, LIQUID EJECTING HEAD UNIT, AND LIQUID EJECTING APPARATUS

(75) Inventor: Katsuhiro Okubo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 325 days.

This patent is subject to a terminal disclaimer.

(21) Appl. No.: 12/730,974

(22) Filed: Mar. 24, 2010

(65) Prior Publication Data

US 2010/0245474 A1 Sep. 30, 2010

(30) Foreign Application Priority Data

Mar. 26, 2009 (JP) ................................. 2009-076803

(51) Int. Cl.
  *B41J 2/135* (2006.01)
  *B41J 2/14* (2006.01)
  *B41J 2/16* (2006.01)
(52) U.S. Cl. .......................................... 347/44; 347/50
(58) Field of Classification Search ...................... 347/44
See application file for complete search history.

(56) References Cited

U.S. PATENT DOCUMENTS

| 7,156,507 | B2 | 1/2007 | Aruga et al. | |
|---|---|---|---|---|
| 2003/0234845 | A1* | 12/2003 | Tominaga et al. | 347/92 |
| 2005/0062809 | A1* | 3/2005 | Yoshino et al. | 347/85 |
| 2006/0109319 | A1* | 5/2006 | Momose | 347/71 |
| 2008/0198209 | A1 | 8/2008 | Mizoguchi et al. | |

FOREIGN PATENT DOCUMENTS

| JP | 05-246032 | 9/1993 |
|---|---|---|
| JP | 3606282 | 10/2004 |
| JP | 2005-319817 | 11/2005 |
| JP | 2008-200951 | 9/2008 |
| WO | 03/141964 | 5/2003 |

OTHER PUBLICATIONS

U.S. Appl. No. 12/731,975, filed May 17, 2012, Office Action.

* cited by examiner

*Primary Examiner* — Matthew Luu
*Assistant Examiner* — Renee I Wilson
(74) *Attorney, Agent, or Firm* — Workman Nydegger

(57) ABSTRACT

A method for manufacturing a liquid flow passage unit that is disposed between a liquid supply source storing liquid and a head main body and that forms a part of a flow passage leading from the liquid supply source to the head main body, includes bringing a film member into contact with a protrusion formed on the edge of an opening of a flow passage for liquid formed in a main body member made of resin, so as to cover the opening with the film member, pressing the film member covering the opening toward the flow passage, so as to apply a predetermined tension to the film member, and integrally molding a sealing member by pouring resin on the edge of the tensioned film member, so as to fix the film member between the sealing member and the main body member.

10 Claims, 4 Drawing Sheets

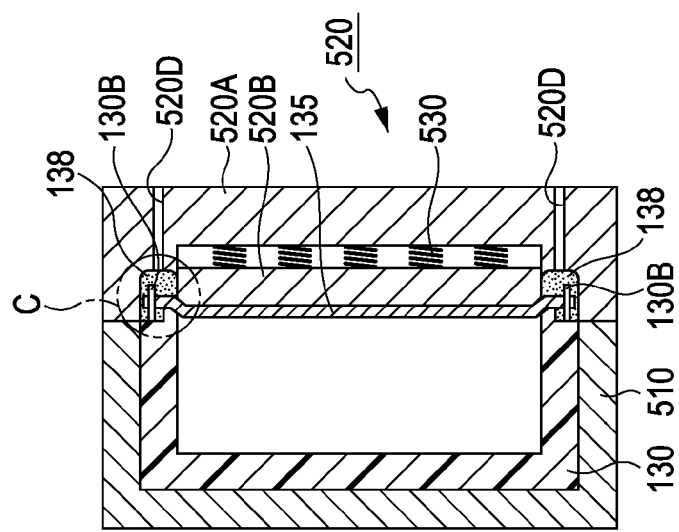
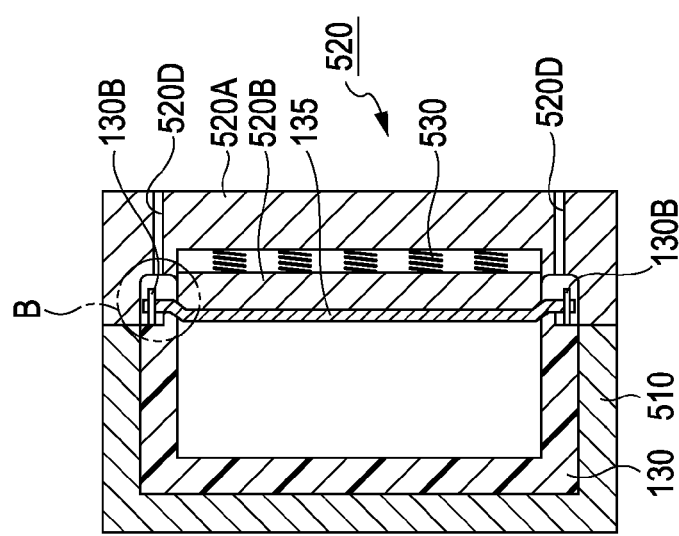
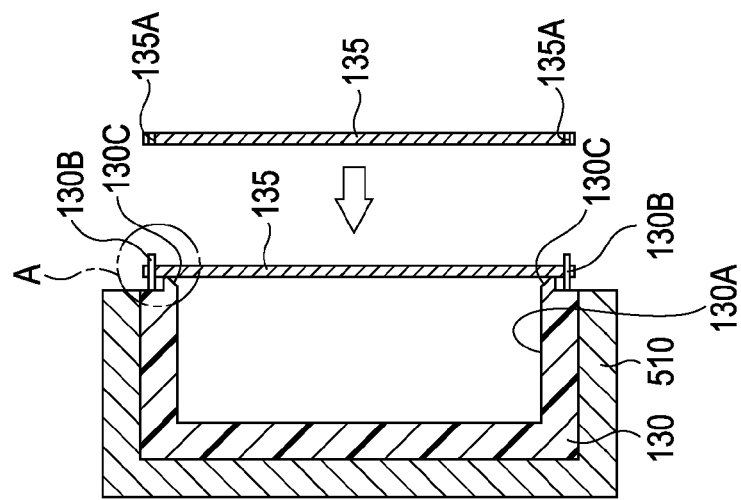

METHOD FOR MANUFACTURING LIQUID FLOW PASSAGE UNIT, LIQUID FLOW PASSAGE UNIT, LIQUID EJECTING HEAD UNIT, AND LIQUID EJECTING APPARATUS

BACKGROUND

1. Technical Field

The present invention relates to a method for manufacturing a liquid flow passage unit, a liquid flow passage unit, a liquid ejecting head unit, and a liquid ejecting apparatus, and is particularly useful when applied to a liquid ejecting head having a liquid flow passage unit for supplying liquid stored in a liquid supply source to a head main body.

2. Related Art

An ink jet recording head that discharges ink droplets from nozzle orifices using pressure generated by displacement of piezoelectric elements is known as a typical example of a liquid ejecting head. In a known ink jet recording head, ink is supplied from a liquid supply source, such as an ink cartridge, filled with ink to a head main body, and the head main body discharges the supplied ink from nozzles by driving pressure generators such as piezoelectric elements or heater elements. For example, by inserting an ink supply needle into an ink cartridge, ink in the ink cartridge is introduced through the inlet of the ink supply needle into the pressure chambers of the head main body.

In some ink jet recording heads, a liquid flow passage unit is provided in a flow passage that supplies ink from a liquid supply source, such as an ink cartridge, to the head main body, and the liquid flow passage unit forms an ink jet recording head unit together with the head main body. This type of liquid flow passage unit fulfills a damper function, that is to say, it controls pressure fluctuation, such as pulsation, of liquid caused by inertial force acting on liquid, for example, when the ink jet recording head unit moves together with a carriage. For this purpose, the liquid flow passage unit has such a structure that an opening of a flow passage for liquid formed in the main body member is covered with a film member so as to form a pressure chamber in a part of the flow passage, and when liquid in the pressure chamber pulsates, the film member bends so as to absorb the pulsation.

JP-A-3606282 discloses a liquid flow passage unit having such a damper function.

When manufacturing such a liquid flow passage unit, the film member is generally heat welded to the main body member. For this purpose, the main body member is made of a polypropylene material (PP material) capable of being heat welded. However, polypropylene materials have problems to be solved with quality. For example, polypropylene materials are inferior to widely-used normal resins in dimensional accuracy and strength. In addition, many burrs remain after molding. Further, polypropylene materials are difficult to bond.

The above-described ink jet recording head is required to be more compact. Accordingly, the liquid flow passage unit is also required to be more compact and more accurate. The liquid flow passage unit is required to have a stable damper function for a long period of time. For this purpose, it is important to stably fix the film member to the main body member while applying an appropriate tension to the film member.

These problems exist not only in ink jet recording head units but also in liquid ejecting head units that eject a liquid other than ink.

SUMMARY

An advantage of some aspects of the invention is that a method for manufacturing a liquid flow passage unit, a liquid flow passage unit, a liquid ejecting head unit, and a liquid ejecting apparatus that can fulfill a stable damper function for a long period of time and that can contribute to reduction in size, are provided.

A first aspect of the invention provides a method for manufacturing a liquid flow passage unit that is disposed between a liquid supply source storing liquid and a head main body and that forms a part of a flow passage leading from the liquid supply source to the head main body. The method includes bringing a film member into contact with a protrusion formed on the edge of an opening of a flow passage for liquid formed in a main body member made of resin, so as to cover the opening with the film member; pressing the film member covering the opening toward the flow passage, so as to apply a predetermined tension to the film member; and integrally molding a sealing member by pouring resin on the edge of the tensioned film member, so as to fix the film member between the sealing member and the main body member.

This method makes it possible to fix the film member to the main body member while applying an appropriate tension to the film member.

The film member is fixed to the main body member by the sealing member that is made of resin by molding integrally with the main body member made of resin. That is to say, the film member is fixed to the main body member not by heat welding, and therefore the main body member can be formed not of polypropylene resin but of a commonly-used resin. As a result, a liquid flow passage unit that is superior in molding accuracy and heat distortion properties and on which fewer burrs remain can easily be manufactured.

The tension may be applied to the film member by bringing a mold into contact with a part of the film member corresponding to the opening and pressing the mold toward the flow passage. The pressing force applied from the mold to the film member may be regulated with a spring. In this case, the tension applied to the film member can be regulated more appropriately.

It is preferable that the molding of the sealing member be performed by pouring resin up to the outside of the edge of the film member. In this case, it can be expected that the sealing member not only applies a tension to the film member but also functions as sealant.

A second aspect of the invention provides a liquid flow passage unit that is disposed between a liquid supply source storing liquid and a head main body and that forms a part of a flow passage leading from the liquid supply source to the head main body. The unit includes a main body member made of resin and having a flow passage for liquid formed therein and protrusions formed on the edge of an opening of the flow passage, a film member pressed into the space between the protrusions, subjected to a predetermined tension, and covering the opening, and a sealing member formed of resin by integral molding so that the film member is fixed between the sealing member and the main body member.

In this unit, the film member is fixed to the main body member while being subjected to an appropriate tension.

The film member is fixed to the main body member by the sealing member that is made of resin by molding integrally with the main body member made of resin. That is to say, the film member is fixed to the main body member not by heat welding, and therefore the main body member can be formed not of polypropylene resin but of a commonly-used resin. As a result, the liquid flow passage unit is superior in molding accuracy and heat distortion properties, and fewer burrs remain thereon.

A third aspect of the invention provides a liquid ejecting head unit. The unit combines a head main body that discharges liquid droplets and a liquid flow passage unit that forms a part of a flow passage that supplies liquid to the head main body. The liquid flow passage unit is that according to the second aspect, and the flow passage of the liquid flow passage unit is communicated with the head main body.

In this liquid ejecting head unit, the film member is fixed to the main body member while being subjected to an appropriate tension. Therefore, when liquid is displaced with the movement of the liquid ejecting head unit, pulsation of liquid that accompanies this can appropriately be controlled. That is to say, an excellent damper effect can be fulfilled.

The film member is fixed to the main body member by the sealing member that is made of resin by molding integrally with the main body member made of resin. That is to say, the film member is fixed to the main body member not by heat welding, and therefore the main body member can be formed not of polypropylene resin but of a commonly-used resin. As a result, this liquid ejecting head unit has a liquid flow passage unit that is superior in molding accuracy and heat distortion properties and on which fewer burrs remain.

A fourth aspect of the invention provides a liquid ejecting apparatus including the above-described liquid ejecting head unit.

In this apparatus, pulsation or the like of liquid that accompanies the movement of a carriage is effectively controlled, and printing quality is ensured.

BRIEF DESCRIPTION OF THE DRAWINGS

The invention will be described with reference to the accompanying drawings, wherein like numbers reference like elements.

FIGS. 2A to 2C are sectional views conceptually showing a method for manufacturing a liquid flow passage unit according to the first embodiment.

DESCRIPTION OF EXEMPLARY EMBODIMENTS

The embodiments of the invention will be described in detail.

First Embodiment

Figure 1:
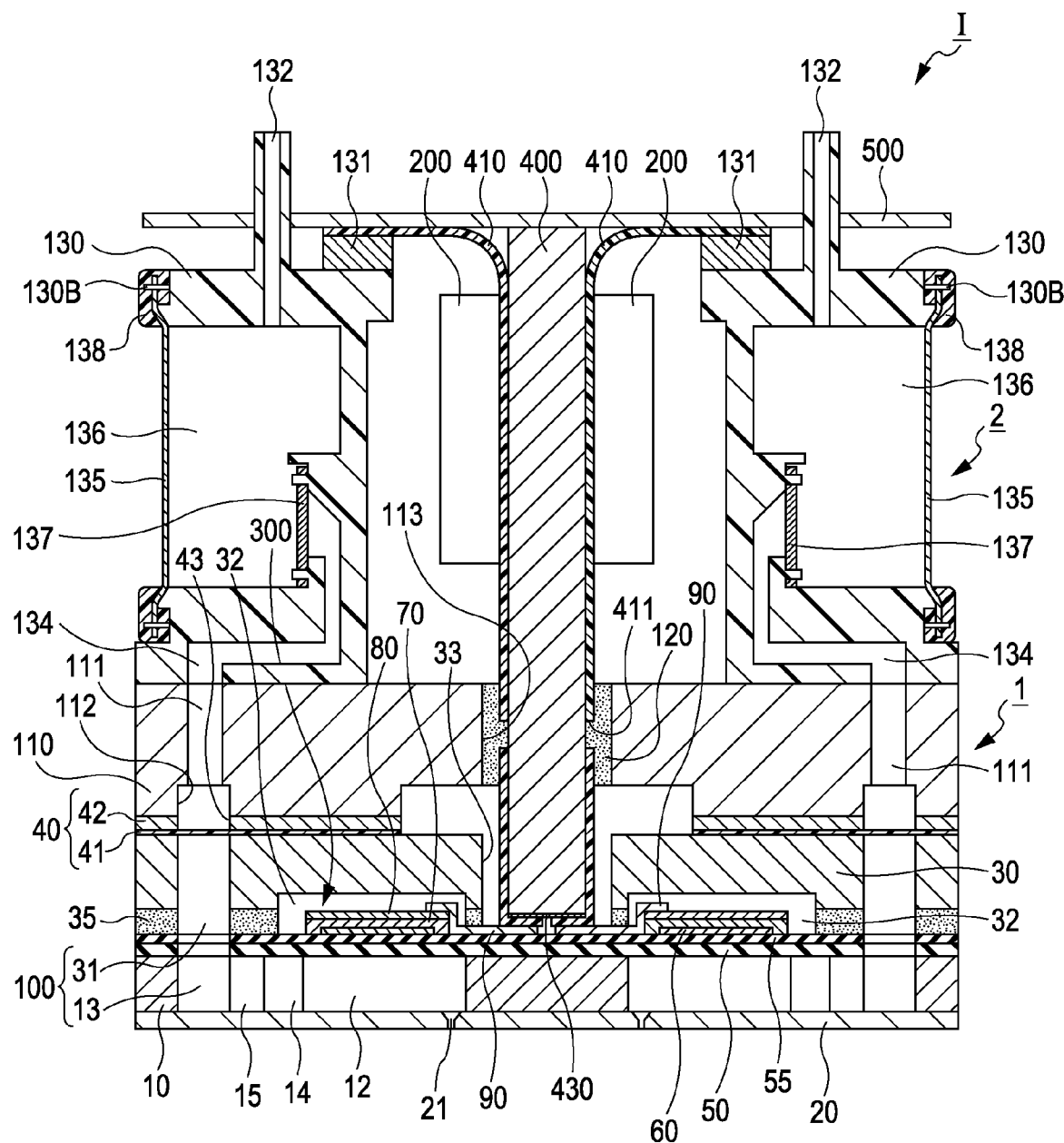
FIG. 1 is a sectional view showing an ink jet recording head unit according to a first embodiment.

FIG. 1 is a sectional view showing an ink jet recording head unit that is an example of a liquid ejecting head unit according to a first embodiment of the invention. As shown in FIG. 1, the ink jet recording head unit I (hereinafter also referred to as head unit I) according to the first embodiment has an ink jet recording unit 1 (hereinafter referred to as head main body 1) having two arrays of nozzles, and two liquid flow passage units 2. The head main body 1 discharges ink droplets from nozzle orifices, thereby performing predetermined printing. Each liquid flow passage unit 2 is disposed in a flow passage that supplies ink from a liquid supply source (not shown), such as an ink cartridge, to the head main body 1. Each liquid flow passage unit 2 is integrated with the head main body 1 and has the damper function. The two arrays of nozzles of the head main body 1 have the same configuration. The two liquid flow passage units 2 also have the same configuration. The number of the arrays of nozzles of the head main body 1 and the number of the liquid flow passage units 2 can be selected arbitrarily if necessary.

A flow passage forming substrate 10 of the head main body 1 is a silicon single crystal substrate having a plane direction (110) in this embodiment. On one side thereof is formed an elastic film 50 that is made of silicon dioxide.

The flow passage forming substrate 10 is provided with two arrays of pressure generating chambers 12 that are separated by partition walls. In each array, the pressure generating chambers 12 are arranged in the width direction thereof. A communication portion 13 is formed in an area on the outer side, in the longitudinal direction of pressure generating chambers 12, of each array of pressure generating chambers 12. The communication portion 13 is communicated with each pressure generating chamber 12 through an ink supply passage 14 and a communication passage 15. The communication portion 13 is in communication with a reservoir portion 31 of a protective substrate 30 to be described below, and forms a part of a reservoir 100 that serves as a common ink chamber shared by the pressure generating chambers 12 in each array. The ink supply passages 14 have a width smaller than that of the pressure generating chambers 12 and maintain the flow passage resistance of ink flowing from the communication portion 13 to the pressure generating chambers 12 constant.

In this embodiment, the ink supply passages 14 are formed by narrowing the width of flow passages from one side. However, ink supply passages may be formed by narrowing the width of flow passages from both sides. Alternatively, instead of narrowing the width of flow passages, ink supply passages may be formed by narrowing from the thickness direction. The communication passages 15 are formed by extending the partition walls on both sides in the width direction of each pressure generating chamber 12 toward the communication portion 13 and defining a space between each ink supply passage 14 and the communication portion 13. That is to say, the flow passage forming substrate 10 is provided with ink supply passages 14 that have a cross-sectional area smaller than the cross-sectional area in the width direction of the pressure generating chambers 12, and communication passages 15 that are in communication with the ink supply passages 14 and that have a cross-sectional area larger than the cross-sectional area in the width direction of the ink supply passages 14, the ink supply passages 14 and the communication passages 15 being separated by a plurality of partition walls.

On the orifice side of the flow passage forming substrate 10, a nozzle plate 20 is attached with adhesive, a heat welding film, or the like. The nozzle plate 20 is provided with nozzle orifices 21 that are in communication with the ends of the pressure generating chambers 12 on the opposite side from the ink supply passages 14. In this embodiment, the flow passage forming substrate 10 is provided with two arrays of pressure generating chambers 12, and therefore the head main body 1 is provided with two arrays of nozzles (nozzle orifices 21). The nozzle plate 20 is made, for example, of glass ceramics, silicon single crystal, or stainless steel.

On the opposite side of the flow passage forming substrate 10 from the orifice side, as described above, an elastic film 50 is formed. On the top of the elastic film 50, an insulator film 55 is formed. On the top of the insulator film 55, a first electrode 60, a piezoelectric body layer 70, and a second electrode 80 are stacked in this order and form a piezoelectric element 300 that serves as a pressure generating element of this embodiment. The piezoelectric element 300 means the portion that includes the first electrode 60, the piezoelectric body layer 70, and the second electrode 80. In general, one of the electrodes of the piezoelectric element 300 serves as a common electrode, and the other electrode and the piezoelectric body layer 70 are patterned for each pressure generating chamber 12. The portion that includes the patterned electrode and piezoelectric body layer 70 and that is piezoelectrically distorted by applying a voltage to both electrodes is referred to as piezoelectric body active portion. In this embodiment, the first electrode 60 on the flow passage forming substrate 10 side serves as a common electrode of the piezoelectric element 300, and the second electrode 80 serves as an individual electrode of the piezoelectric element 300. However, such an arrangement may be reversed depending on arrangement of the drive circuit and wiring. The piezoelectric element 300 and a vibrating plate that is displaced by the drive of the piezoelectric element 300 are collectively referred to as an actuator device. In the above-described example, the elastic film 50, the insulator film 55, and the first electrode 60 act as a vibrating plate. Of course, the invention is not limited to this. For example, the elastic film 50 and the insulator film 55 may be omitted and only the first electrode 60 may act as a vibrating plate. Alternatively, the piezoelectric element 300 itself may substantially double as a vibrating plate.

The piezoelectric body layer 70 is made of a piezoelectric material that exhibits the electromechanical transduction effect, particularly a ferroelectric material that has a perovskite structure. The piezoelectric body layer 70 is preferably a crystal film that has a perovskite structure, and is preferably formed, for example, of a ferroelectric material, such as lead zirconate titanate (PZT), undoped or doped with a metal oxide such as niobium oxide, nickel oxide, or magnesium oxide.

A lead electrode 90 that extends to the upper surface of the insulator film 55 and that is made, for example, of gold (Au) is connected to the second electrode 80 that is an individual electrode of the piezoelectric element 300. One end of the lead electrode 90 is connected to the second electrode 80, and the other end of the lead electrode 90 extends to the area between the arrays of piezoelectric elements 300.

On the flow passage forming substrate 10, on which the piezoelectric elements 300 are formed, that is to say, on the first electrode 60, the elastic film 50, and the lead electrode 90, the protective substrate 30 having the reservoir portion 31 that forms at least a part of the reservoir 100 is bonded with an adhesive agent 35. In this embodiment, the reservoir portion 31 is formed throughout the thickness of the protective substrate 30 so as to extend in the width direction of the pressure generating chamber 12. As described above, the reservoir portion 31 is communicated with the communication portion 13 of the flow passage forming substrate 10 and forms the reservoir 100 that serves as a common ink chamber shared by the pressure generating chambers 12. In this embodiment, the communication portion 13 that forms a part of the reservoir 100 is provided in the flow passage forming substrate 10. However, the invention is not limited to this. For example, the communication portion 13 of the flow passage forming substrate 10 may be divided into a plurality of portions corresponding to the pressure generating chambers 12, and only the reservoir portion 31 may serve as a reservoir. Alternatively, for example, only the pressure generating chamber 12 may be provided in the flow passage forming substrate 10, and an ink supply passage 14 that allows the reservoir and each pressure generating chamber 12 to be communicated with each other may be provided in a member lying between the flow passage forming substrate 10 and the protective substrate 30 (for example, the elastic film 50 or the insulator film 55).

In the area of the protective substrate 30 that faces the piezoelectric elements 300, a piezoelectric element holding portion 32 is provided that is a holding portion having a space large enough not to inhibit movements of the piezoelectric elements 300. The piezoelectric element holding portion 32 has only to have a space large enough not to inhibit movements of the piezoelectric elements 300. The space may be hermetically sealed or left unsealed. In this embodiment, two arrays of piezoelectric elements 300 are provided, and accordingly, each array of piezoelectric elements 300 is provided with a piezoelectric element holding portions 32. That is to say, the protective substrate 30 is provided with two piezoelectric element holding portions 32 extending in the direction in which the piezoelectric elements 300 are arranged.

The protective substrate 30 is preferably formed of a material that has substantially the same coefficient of thermal expansion as the flow passage forming substrate 10, for example, glass or a ceramic material. In this embodiment, the protective substrate 30 is formed using the same silicon single crystal substrate made of the same material as the flow passage forming substrate 10.

The protective substrate 30 is provided with a through hole 33 formed in the thickness direction of the protective substrate 30. In this embodiment, the through hole 33 is disposed between the two piezoelectric element holding portions 32. An end portion of the lead electrode 90 extending from each piezoelectric element 300 is exposed in the through hole 33.

A drive circuit 200 that is an IC for driving the piezoelectric element 300 is mounted on a COF substrate 410 that is a flexible printed wiring substrate. The COF substrate 410 is bonded to the side of a plate-like holding member 400 that is arranged substantially vertically and the lower end of which is connected to the lead electrode 90. That is to say, the holding member 400 is a rectangular parallelepiped both sides of which are vertical surfaces. In this embodiment, the holding member 400, the COF substrate 410, and the drive circuit 200 form a wiring substrate.

To describe in more detail, in the head main body 1 according to this embodiment, two arrays of pressure generating chambers 12 are provided in the flow passage forming substrate 10, and accordingly, two arrays of piezoelectric elements 300 are provided in which piezoelectric elements 300 are arranged in the width direction of the pressure generating chamber 12 (the width direction of the piezoelectric element 300). That is to say, two arrays of pressure generating chambers 12, two arrays of piezoelectric elements 300, and two arrays of the lead electrodes 90 are provided so as to face each other. To both sides of the holding member 400 with its lower part in the through hole 33, the COF substrates 410 are bonded. The lower end of each COF substrate 410 is connected to the end portions of the lead electrodes 90 of each array of piezoelectric elements 300, and each COF substrate 410 is arranged substantially vertically. In this embodiment, a COF substrate 410 is provided on each side of the holding member 400, and the holding member 400 is thereby provided with a total of two COF substrates 410. Arranging each COF substrate 410 substantially vertically reduces the sizes in the planar direction of the lead electrodes 90 and the first electrodes 60, thereby making the head compact.

When arranged vertically alone, the COF substrate 410 that is a flexible printed wiring substrate is prone to bend. Accordingly, by bonding the COF substrate 410 to the holding member 400 that is a rigid member serving as a support, the COF substrate 410 can be arranged vertically without bending. Of course, it is possible to omit the holding member 400 and to arrange only the COF substrate 410 vertically, in a direction perpendicular to the surface of the flow passage forming substrate 10 on which the piezoelectric element 300 is provided. In this embodiment, the COF substrate 410 is bonded to the side of the holding member 400. However, the invention is not limited to this. For example, the COF substrate 410 may be leaned against the holding member 400.

Between the lower end face of the holding member 400 and the lower end portion of the COF substrate 410, a buffer member 430 is disposed that is preferably formed of Teflon (a registered trademark) or the like. The lower end portion of the COF substrate 410 and the lead electrode 90 are electrically connected by conductive particles (for example, those contained in an anisotropic conductive material, such as an anisotropic conductive film (ACF) or anisotropic conductive paste (ACP)). That is to say, when the holding member 400 is pressed down, the lower end face thereof presses the COF substrate 410 against the lead electrode 90. The conductive particles is thereby squashed to achieve predetermined electrical connection between the COF substrate 410 and the lead electrode 90. At this time, the buffer member 430 serves to uniform the pressure on the COF substrate 410. It is preferable that the lower end face of the holding member 400 and the lower end portion of the COF substrate 410, or the lower end face of the holding member 400 in contact with the buffer member 430 have surface accuracy within five times the particle diameter of the conductive particles. The reason is that, in such a case, due to the existence of the buffer member 430, the pressure applied through the lower end portion of the COF substrate 410 to the conductive particles can be uniformed, the conductive particles are reliably squashed, and excellent electrical connection can be achieved. Of course, the connection between the lower end portion of the COF substrate 410 and the lead electrode 90 is not limited to conductive particles. For example, they may be connected by fusing a metallic material such as solder.

It is preferable that the holding member 400 have such thermal conductivity that allows the holding member 400 to dissipate heat so that the temperature of the drive circuit 200 is lower than the junction temperature even when the head main body 1 is used at the maximum warranty temperature. In such a case, even when the drive circuit operates under the most severe load condition, sufficient heat dissipation is exhibited, and accordingly, stable driving of the drive circuit for a long period of time can be achieved. Accordingly, the holding member 400 in this embodiment is formed of stainless steel. In such a case, the heat generated by the drive circuit 200 is transferred by the holding member 400 to the flow passage forming substrate 10 so as to be absorbed by ink in the inside of the flow passage forming substrate 10. As a result, the heat generated by the drive circuit 200 can effectively be dissipated. The same effect can be obtained by making the distance between the surface of the flow passage forming substrate 10 and the drive circuit 200 sufficiently short even when the holding member 400 is not formed of metal such as stainless steel. That is to say, the distance between the drive circuit 200 and the flow passage forming substrate 10 is such a distance that heat can be dissipated so that the temperature of the drive circuit 200 is lower than the junction temperature even when the head main body 1 is used at the maximum warranty temperature.

It is preferable that the holding member 400 be formed of a material that has an linear expansion coefficient equivalent to that of a head case 110 that is a holding member to be described later in detail. For example, stainless steel or silicon may be used as the material of the holding member 400.

On the protective substrate 30, a compliance substrate 40 is bonded that includes a sealing film 41 and a fixation plate 42. Here, the sealing film 41 is formed of a flexible material having low rigidity (for example, a polyphenylene sulfide (PPS) film). One side of the reservoir portion 31 is sealed by the sealing film 41. The fixation plate 42 is formed of a hard material such as metal (for example, stainless steel). An area of the fixation plate 42 that faces the reservoir 100 is an opening 43 throughout the thickness, and accordingly, one side of the reservoir 100 is sealed by only the sealing film 41 having flexibility.

On the compliance substrate 40, the head case 110 serving as a holding member is provided. In the head case 110, an ink introduction passage 111 that supplies ink to the reservoir 100 from an ink storing unit, such as a cartridge, is provided.

The ink introduction passage 111 is in communication with the ink outlet 134 of the liquid flow passage unit 2. Ink is supplied through the liquid flow passage unit 2 from a liquid supply source (not shown), such as an ink cartridge, to the reservoir 100.

In an area of the head case 110 that faces the sealing film 41, a recess 112 is formed so that bending deformation of the sealing film 41 is appropriately performed. In the head case 110, a wiring member holding hole 113 that is communicated with the through hole 33 that is formed in the protective substrate 30 is provided. The COF substrate 410 and the holding member 400 are passed through the wiring member holding hole 113, and the lower end portion of the COF substrate 410 is connected to the lead electrode 90. The COF substrate 410 and the holding member 400 that are passed through the wiring member holding hole 113 of the head case 110 are fixed to the head case 110 with the adhesive agent 120. Only the COF substrate 410 may be bonded to the head case 110 with the adhesive agent 120. However, by directly bonding the head case 110 and the holding member 400, the holding member 400 can be held in the head case 110 more securely. That is to say, by bonding the head case 110 and the holding member 400 that are rigid members, a state where the COF substrate 410 and the lead electrode 90 are reliably connected can be maintained. Accordingly, trouble such as disconnection between the COF substrate 410 and the lead electrode 90 can be prevented. Therefore, in this embodiment, through holes 411 are provided in the COF substrate 410 at predetermined intervals along the direction in which the lead electrodes 90 are arranged, and through these holes 411, the head case 110 and the holding member 400 are bonded with the adhesive agent 120. In the case where the head case 110 and the holding member 400 are directly bonded, the head case 110 and the holding member 400 are preferably formed of materials having the same linear expansion coefficient. In this embodiment, the head case 110 and the holding member 400 are formed of stainless steel. Accordingly, when the head main body 1 is expanded or contracted by heat, warpage or destruction due to a difference in linear expansion coefficient between the head case 110 and the holding member 400 can be prevented. If the head case 110 and the holding member 400 are formed of materials having different linear expansion coefficients, the holding member 400 presses the flow passage forming substrate 10, and the flow passage forming substrate 10 may crack. In addition, it is preferable that the head case 110 and the holding member 400 be formed of materials having substantially the same linear expansion coefficient as that of the protective substrate 30 to which these members are fixed.

In the head main body 1, each COF substrate 410 extends on the opposite side from the ink discharge surface on which the nozzle orifices 21 open (upward in the figure), and the upper end thereof is horizontally bent and connected to a connecting substrate 500. To describe in more detail, the upper end of the COF substrate 410 is placed on the top of the main body member 130 of the liquid flow passage unit 2 with a pad member 131 therebetween, and the connecting substrate 500 is connected to the upper end in such a state from above.

The liquid flow passage unit 2 discharges ink that is introduced from a liquid supply source, such as an ink cartridge, through an ink inlet 132, toward the reservoir 100 through the ink outlet 134, and forms a part of a flow passage leading from the liquid supply source to the head main body 1. The ink inlet 132, passing through the connecting substrate 500, protrudes upward from the space between the head main body 1 and the connecting substrate 500. In such a state, a tube or the like (not shown) for introducing ink from the ink supply source is connected to the ink inlet 132. The liquid flow passage unit 2 is placed on the head case 110 with the lower surface of the main body member 130 directly in contact with the surface of the head case 110, and with the ink outlet 134 directly in communication with the ink inlet 111.

As clearly shown in FIGS. 2A to 2C, the liquid flow passage unit 2 also functions as a damper that controls pulsation of ink introduced through the ink inlet 132. The liquid flow passage unit 2 has a pressure chamber 136 that is formed by covering an opening 130A of the flow passage of the main body member 130 with a film member 135. When ink stored in the pressure chamber 136 is shaken by external vibration, the film member 135 bends, thereby controlling pulsation of ink.

To describe in more detail, the main body member 130 is a container made of resin. The main body member 130 has an opening 130A on one side of the flow passage through which ink flows. Protrusions 130B are formed on the edge of the opening 130A. The main body member 130 is molded of a normal resin capable of high-precision molding (for example, PPS, PPE, or Hi-PS alloy). The film member 135 covers the opening 130A, with the protrusions 130B in the holes 135A, while being subjected to a predetermined tension. The film member 135 is fixed between the sealing member 138 and the main body member 130. The sealing member 138 is formed of resin by molding integrally with the main body member 130. As a result, a pressure chamber 136 is formed that is defined by the film member 135 subjected to a predetermined tension. In the flow passage of the liquid flow passage units 2 is disposed a filter 137 for finally removing foreign material from ink supplied to the reservoir 100.

In this embodiment described above, ink supplied from a liquid supply source, such as an ink cartridge, is supplied through the liquid flow passage unit 2 to the reservoir 100 of the head main body 1. Thus, in the head main body 1, ink flowing from the reservoir 100 into the pressure generating chamber 12 is discharged by the drive of the piezoelectric element 300 from the pressure generating chambers 12 through the nozzle orifice 21.

The liquid flow passage unit 2 functions as a flow passage for ink leading from an ink supply source to the head main body 1 and also functions as a damper. In other words, the liquid flow passage unit 2, which is a part of the flow passage and functions as a damper, is disposed in a space between the connecting substrate 500 and the head main body 1. Therefore, the space can be used effectively, and this contributes to the reduction in size of the head unit I. The space between the connecting substrate 500 and the head main body 1 is indispensable, for example, because the COF substrate 410 is vertically arranged.

Figure 3A:
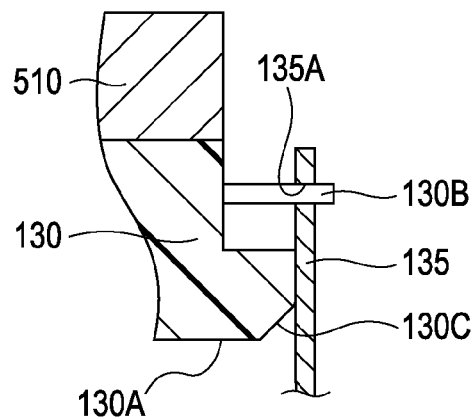
FIGS. 3A to 3C are enlarged sectional views showing parts of FIGS. 2A to 2C.

FIGS. 2A to 2C are explanatory views conceptually showing a method for manufacturing the liquid flow passage units 2 according to this embodiment. As shown in FIGS. 2A and 3A, which is an enlarged view of the part A of FIG. 2A, a main body member 130 made of resin is placed in a mold 510. The main body member 130 has a flow passage formed therein by molding and a filter 137 and the like mounted thereon. Protrusions 130B on the main body member 130 are inserted into holes 135A in a film member 135. Thus, the opening 130A is covered with the film member 135.

Next, as shown in FIG. 2B, another mold 520 is brought into contact with the mold 510. The mold 520 includes a container-like outer mold 520A and an inner mold 520B that is disposed inside the outer mold 520A and protrudes slightly forward from the end face of the outer mold 520A. The inner mold 520B is placed in the outer mold 520A with springs 530 therebetween. The face of the inner mold 520B is substantially the same shape as the opening 130A of the main body member 130 and is brought into contact with the film member 135.

Therefore, by bringing the mold 520 into contact with the mold 510, the inner mold 520B is brought into contact with the part of the film member 135 corresponding to the opening 130A and presses it toward the flow passage. The film member 135 covering the opening 130A is thereby pressed toward the flow passage, and a predetermined tension is applied to the film member 135. A chamfer 130C is formed on the edge of the opening 130A in the main body member 130 so as to relax the stress concentrated on the film member 135.

Figure 3B:
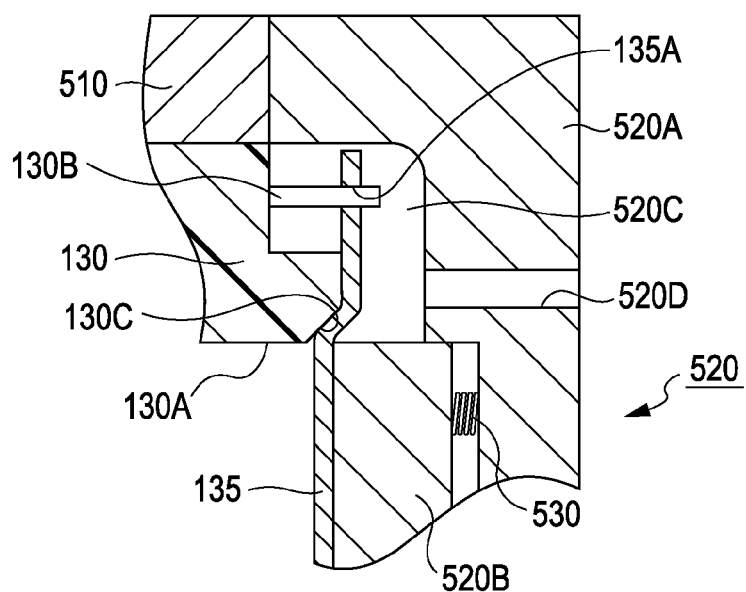

As shown in FIGS. 2B and 3B, which is an enlarged view of the part B of FIG. 2B, a space 520C corresponding to the outer shape of the sealing member 138 is provided in the end face of the outer mold 520A. This space can be filled with resin. The space 520C has such a shape that resin can be poured up to the outside of the edge of the film member 135.

Figure 3C:
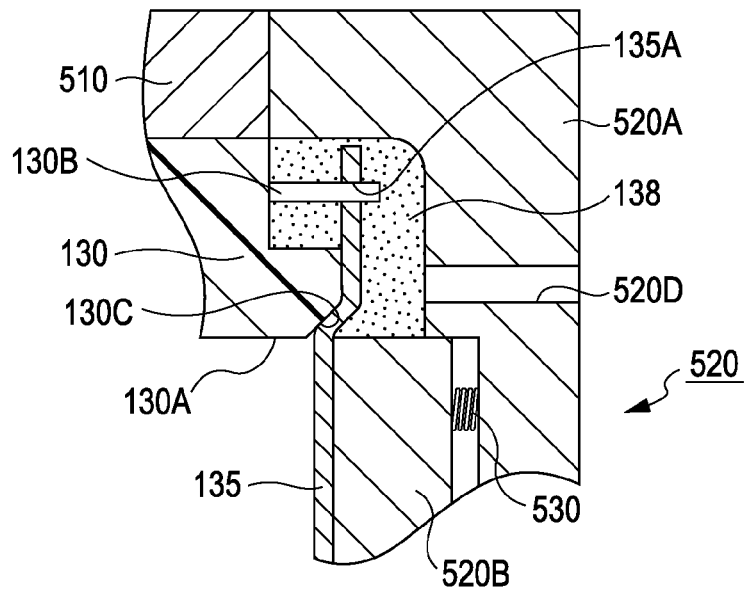

Finally, as shown in FIGS. 2C and 3C, which is an enlarged view of the part C of FIG. 2C, resin is poured into the space 520C on the edge of the tensioned film member 135, through the resin inlet 520D. Thus, the sealing member 138 is integrally molded. As a result, the film member 135 is fixed between the sealing member 138 and the main body member 130.

Even if the film member 135 is slightly expanded by the heat accompanying the resin infusion at the time of molding of the sealing member 138, an appropriate tension can be applied to the part of the film member 135 corresponding to the opening 130A. The film member 135 is thereby fixed to the main body member 130 without loosening under a constant tension and can therefore exert a stable damper effect for a long period of time.

The dual structure of the mold 520 is not essential. The outer mold 520A and the inner mold 520B may be integrated as long as the surface to be brought into contact with the opening 130A protrudes slightly forward. In the case where the inner mold 520B is placed in the outer mold 520A with springs 530 therebetween, the pressing force on the film member 135 can be regulated optimally. When molding the sealing member 138, it is not essential to pour resin up to the outside of the edge of the film member 135. However, the sealing member 138 molded in this manner is capable of sealing the pressure chamber 136 tightly so that ink does not leak, as well as fixing the film member 135.

Other Embodiments

In the first embodiment described above, the head main body 1 has an actuator device including a thin-film piezoelectric element 300 serving as a pressure generating element that causes a pressure change in the pressure generating chambers 12. However, the invention is not limited to this. For example, an actuator device of a thick film type that is formed, for example, by attaching a green sheet, or an actuator device of a vertical-vibration type in which a piezoelectric material and an electrode forming material are alternately laminated and expanded and contracted in the axis direction, may be used in the head main body. Alternatively, a heater element that is disposed inside a pressure generating chamber and that generates heat to form a bubble and thereby discharges a liquid droplet from a nozzle orifice, or a so-called electrostatic actuator that generates static electricity between a vibrating plate and an electrode to deform the vibrating plate and thereby discharges a liquid droplet from a nozzle orifice, may be used as a pressure generating element.

In the first embodiment described above, the head main body 1 and the liquid flow passage unit 2 are integrally combined. Of course, the head main body 1 and the liquid flow passage unit 2 may be arranged separately from each other and communicated with each other through a tube or the like. However, integral configuration as in the first embodiment described above can reduce the overall size of the head unit I.

In the above-described embodiment, the flow passage forming substrate 10 is provided with two arrays of pressure generating chambers 12. However, the number of arrays is not limited. The flow passage forming substrate 10 may be provided with one or three arrays of pressure generating chambers 12. In the case of a plurality of arrays, at least a pair of arrays are arranged so as to face each other.

In the first embodiment described above, the liquid flow passage unit 2 has only the filter 137. However, of course, the liquid flow passage unit 2 may have a self-sealing function. The self-sealing function means a function to supply ink through the ink outlet 134 to the reservoir 100 only when the head main body 1 is under negative pressure. This function is achieved by disposing an on-off valve that opens only when the head main body 1 is under negative pressure, in the flow passage of the liquid flow passage unit 2.

Figure 4:
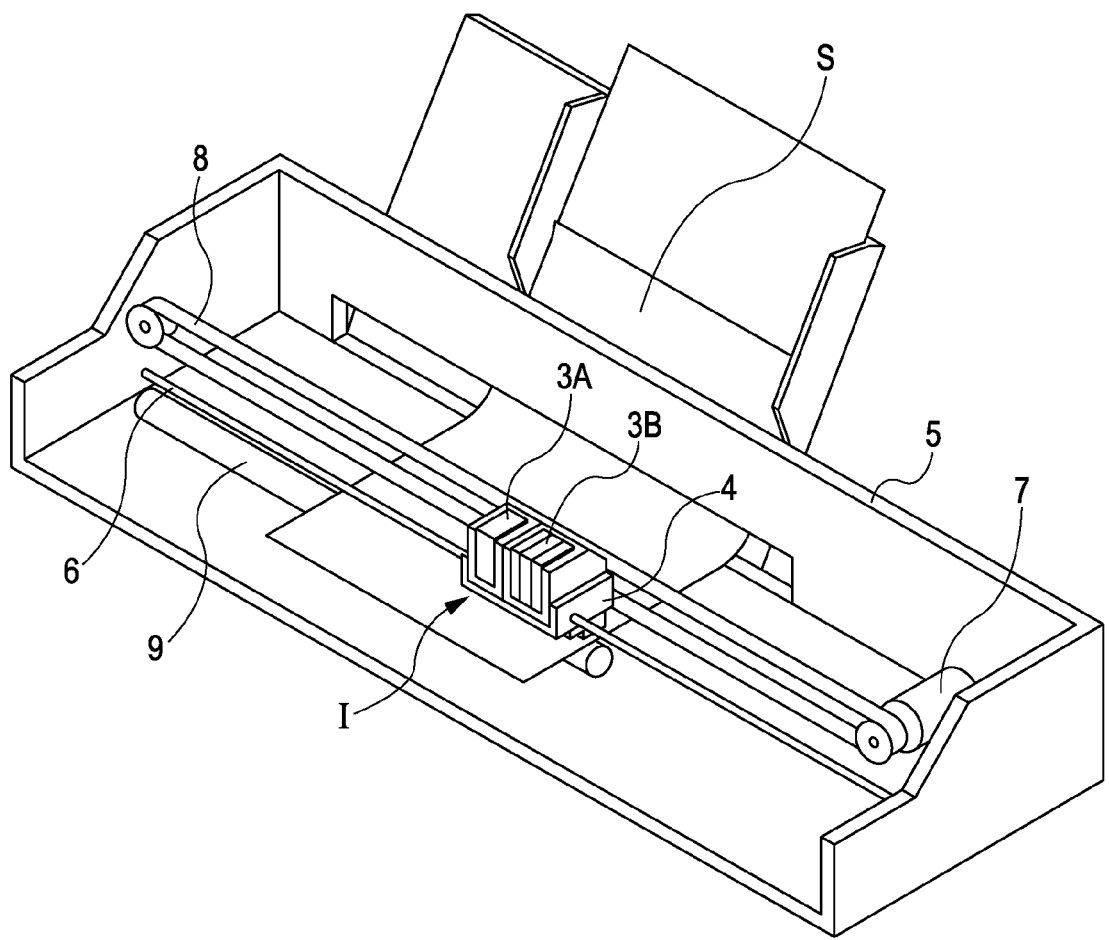
FIG. 4 is a schematic view showing an ink jet recording apparatus according to an embodiment.

The head unit I according to the first embodiment described above is mounted in an ink jet recording apparatus. FIG. 4 is a schematic view showing an example of the ink jet recording apparatus. As shown in the figure, the head unit I according to the first embodiment described above is provided with detachable cartridges 3A and 3B serving as ink supply units. A carriage 4 on which the head units I is mounted is provided on a carriage shaft 6 attached to the apparatus main body 5, so as to be movable in the shaft direction. The head unit I is configured to discharge, for example, a black ink composition and a color ink composition.

The driving force of the driving motor 7 is transmitted to the carriage 4 through a plurality of gears (not shown) and a timing belt 8, and thereby the carriage 4 on which the head unit I is mounted moves along the carriage shaft 6. In the apparatus main body 5, a platen 9 is provided along the carriage shaft 6, and a recording sheet S serving as a recording medium such as a paper sheet that is fed by a paper feed roller or the like (not shown) is wound around the platen 9 so as to be transported.

The flow passage structure and material are not limited to those described above.

In the above-described embodiments, an ink jet recording head is described as an example of a liquid ejecting head. However, the invention is intended for liquid ejecting heads in general. Of course, the invention may be applied to a liquid ejecting head that ejects liquid other than ink, as well. Examples of other liquid ejecting heads include various recording heads that are used in an image recording apparatus such as a printer, a color material ejecting head that is used for manufacturing a color filter of a liquid crystal display or the like, an electrode material ejecting head that is used for forming an electrode of an organic EL display, an FED (field emission display), or the like, and a bioorganic material ejecting head that is used for manufacturing a bio chip.

What is claimed is:

1. A method for manufacturing a liquid flow passage unit that is disposed between a liquid supply source storing liquid and a head main body and that forms a part of a flow passage leading from the liquid supply source to the head main body, the method comprising:
   bringing a film member into contact with an edge of an opening of a flow passage for liquid formed in a main body member made of resin, so as to cover the opening with the film member;
   pressing the film member covering the opening toward the flow passage, so as to apply a predetermined tension to the film member; and
   integrally molding a sealing member by pouring resin on the edge of the tensioned film member, so as to fix the film member between the sealing member and the main body member.

2. The method according to claim 1, wherein the tension is applied to the film member by bringing a mold into contact with a part of the film member corresponding to the opening and pressing the mold toward the flow passage.

3. The method according to claim 2, wherein the pressing force applied from the mold to the film member can be regulated with a spring.

4. The method according to claim 1, wherein the molding of the sealing member is performed by pouring resin up to the outside of the edge of the film member.

5. A liquid flow passage unit that is disposed between a liquid supply source storing liquid and a head main body and that forms a part of a flow passage leading from the liquid supply source to the head main body, the unit comprising:
   a main body member made of resin and having a flow passage for liquid formed therein and forming an opening of the flow passage;
   a film member, subjected to a predetermined tension, and covering the opening; and
   a sealing member formed of resin by integral molding so that the film member is fixed between the sealing member and the main body member.

6. A liquid ejecting head unit combining: a head main body that discharges liquid droplets; and a liquid flow passage unit that forms a part of a flow passage that supplies liquid to the head main body, wherein the liquid flow passage unit is that according to claim 5, and the flow passage of the liquid flow passage unit is communicated with the head main body.

7. A liquid ejecting apparatus comprising the liquid ejecting head unit according to claim 6.

8. The method according to claim 1, wherein a protrusion is formed on the edge of the opening of the flow passage and where the film member is brought into contact with the protrusion.

9. A liquid flow passage unit according to claim 5, further comprising:
   one or more protrusions formed on an edge of the opening of the flow passage.

10. A liquid flow passage unit according to claim 9, wherein the film member is pressed into a space between the one or more protrusions.

* * * * *